(12) United States Patent
Evancich et al.

(10) Patent No.: US 10,148,438 B2
(45) Date of Patent: Dec. 4, 2018

(54) METHODS AND APPARATUS FOR PROTECTING SENSITIVE DATA IN DISTRIBUTED APPLICATIONS

(75) Inventors: Nicholas H. Evancich, Clarksburg, MD (US); Alexander E. Schoof, Herndon, VA (US)

(73) Assignee: Rally Health, Inc., Washington, DC (US)

( * ) Notice: Subject to any disclaimer, the term of this patent is extended or adjusted under 35 U.S.C. 154(b) by 88 days.

(21) Appl. No.: 13/438,552

(22) Filed: Apr. 3, 2012

(65) Prior Publication Data
US 2013/0262867 A1    Oct. 3, 2013

(51) Int. Cl.
*H04L 9/32* (2006.01)
*H04L 29/06* (2006.01)

(52) U.S. Cl.
CPC ........ *H04L 9/3226* (2013.01); *H04L 9/3213* (2013.01); *H04L 63/08* (2013.01)

(58) Field of Classification Search
CPC ... G06F 21/606; H04L 63/18; H04L 63/0807; H04L 9/3226; H04L 9/3213; H04L 63/08; H04L 63/3226; H04L 63/3213
USPC ....................................................... 713/168
See application file for complete search history.

(56) References Cited

U.S. PATENT DOCUMENTS

| 5,784,463 | A | 7/1998 | Chen et al. |
| 5,884,312 | A | 3/1999 | Dustan et al. |
| 5,974,144 | A | 10/1999 | Brandman |
| 6,986,040 | B1 * | 1/2006 | Kramer et al. ............... 713/155 |
| 7,716,484 | B1 * | 5/2010 | Kaliski, Jr. .................... 713/176 |
| 7,921,292 | B1 * | 4/2011 | Pauker et al. ................ 713/171 |
| 8,255,984 | B1 * | 8/2012 | Ghostine et al. ................. 726/8 |
| 8,316,237 | B1 * | 11/2012 | Felsher ................. H04L 9/0841 380/282 |
| 2005/0198379 | A1 * | 9/2005 | Panasyuk ................ G06F 21/31 709/239 |
| 2005/0232428 | A1 * | 10/2005 | Little .................... H04L 9/0841 380/277 |
| 2007/0174271 | A1 * | 7/2007 | Mattsson .......... G06F 17/30477 |
| 2007/0180259 | A1 * | 8/2007 | Bulot et al. .................... 713/183 |
| 2008/0037785 | A1 | 2/2008 | Gantman et al. |
| 2009/0024566 | A1 * | 1/2009 | Wong ................ G06F 17/30477 |

(Continued)

OTHER PUBLICATIONS

International Search Report and Written Opinion for International Application No. PCT/US2013/034907, dated Jul. 26, 2013.

*Primary Examiner* — Linglan E Edwards
*Assistant Examiner* — Forrest L Carey
(74) *Attorney, Agent, or Firm* — Cooley LLP (57) ABSTRACT

In some embodiments, a method includes receiving encrypted information associated with a user, and calculating a first portion of a shared secret based on the encrypted information associated with the user. The method also includes defining a completed portion of the shared secret based on the first portion of the shared secret and a second portion of the shared secret and storing the completed portion of the shared secret in a memory for a pre-defined period of time. The method includes defining a ticket based on the completed portion of the shared secret, and sending the ticket to a device associated with the user such that data associated with the ticket is accessible based on the ticket within the pre-defined period of time, and not accessible without the ticket or after the pre-defined period of time.

35 Claims, 4 Drawing Sheets

(56) References Cited

U.S. PATENT DOCUMENTS

2009/0300355 A1* 12/2009 Crane ................... G06F 21/33
                                                                       713/168
2010/0017599 A1    1/2010  Sellars et al.
2011/0145570 A1    6/2011  Gressel et al.
2012/0005213 A1    1/2012  Hannan et al.

\* cited by examiner

```
┌─────────────────────────────────────────────────────────────────┐
│ Receive, from each authorized user device at a security module, a │
│ message including a hash of the password for that authorized user, and │
│ a hash of a username for that authorized user concatenated with the │
│                          password.                              │
│                            202                                  │
└─────────────────────────────────────────────────────────────────┘
                                │
                                ▼
┌─────────────────────────────────────────────────────────────────┐
│ Compute, at the security module and in response to the message, a │
│              user ID unique to the user.                        │
│                            204                                  │
└─────────────────────────────────────────────────────────────────┘
                                │
                                ▼
┌─────────────────────────────────────────────────────────────────┐
│ Compute, at the security module, a shared secret associated with the │
│                          user ID.                               │
│                            206                                  │
└─────────────────────────────────────────────────────────────────┘
                                │
                                ▼
┌─────────────────────────────────────────────────────────────────┐
│ Store, at a database, the encrypted user data associated with the user, │
│                 indexed by the user ID.                         │
│                            208                                  │
└─────────────────────────────────────────────────────────────────┘
                                │
                                ▼
┌─────────────────────────────────────────────────────────────────┐
│     Split, at the security module, the shared secret into portions. │
│                            210                                  │
└─────────────────────────────────────────────────────────────────┘
                                │
                                ▼
┌─────────────────────────────────────────────────────────────────┐
│ Store, permanently at the memory of the security module, a portion of │
│        the shared secret indexed by the user ID.                │
│                            212                                  │
└─────────────────────────────────────────────────────────────────┘
                                │
                                ▼
┌─────────────────────────────────────────────────────────────────┐
│ Send, from the security module, a unique portion of the shared secret │
│              to each trusted user device.                       │
│                            214                                  │
└─────────────────────────────────────────────────────────────────┘
                                │
                                ▼
┌─────────────────────────────────────────────────────────────────┐
│ Send, from the security module, a portion(s) of the shared secret to the │
│                  authorized user device.                        │
│                            216                                  │
└─────────────────────────────────────────────────────────────────┘
```

Send, from a user device to the security module, an indication having a hashed form of the password, a hashed form of the username concatenated with the password, a user ID and a nonce.
502

↓

Compute, at the security module and in response to the indication, a first portion of a shared secret associated with the user, and define a completed portion of the shared secret based on the first portion of the shared secret and a second portion of the shared secret that is accessible by the security module and not the user device. Store, at the memory, the completed portion of the shared secret for a pre-defined time period.
504

↓

Build, at the security module, a ticket based on the completed portion of the shared secret and a time out value indicating how long the ticket is valid. Increment, at the security module, the nonce and send the ticket, time out value and the incremented nonce to the user device.
506

↓

Send, from the user device, a query with the ticket to the query module.
508

↓

Send, from the query module, a query to the database and receive in response to the query, query results with encrypted fields.
510

↓

Send, from the query module, the ticket to the security module and receive in response, the decryption key from the security module.
512

↓

Use the decryption key, by the query module, to decrypt the query results and send from the query module, the decrypted query results back to the user device.
514

FIG. 4

METHODS AND APPARATUS FOR PROTECTING SENSITIVE DATA IN DISTRIBUTED APPLICATIONS

BACKGROUND

Some embodiments described herein relate generally to the methods and apparatus for implementing a computer network authentication protocol used for securely storing and accessing sensitive data in distributed applications, including for example, web-based and cloud-based applications.

Systems storing sensitive user-associated data such as user health care information are susceptible to compromise. In some instances, user passwords can be compromised that may reveal sensitive individual user data. In other instances, system security compromise may reveal sensitive multiple user data. Accordingly, a need exists for methods and apparatus for improved protection of sensitive user data in a variety of applications, such as in health care service applications.

SUMMARY

In some embodiments, a method includes receiving encrypted information associated with a user, and calculating a first portion of a shared secret based on the encrypted information associated with the user. The method also includes defining a completed portion of the shared secret based on the first portion of the shared secret and a second portion of the shared secret, and storing the completed portion of the shared secret in a memory for a pre-defined period of time. The method includes defining a ticket based on the completed portion of the shared secret, and sending the ticket to a device associated with the user such that data associated with the ticket is accessible based on the ticket within the pre-defined period of time, and not accessible without the ticket or after the pre-defined period of time.

DETAILED DESCRIPTION

In some embodiments, a method includes receiving encrypted information associated with a user, and calculating a first portion of a shared secret based on the encrypted information associated with the user. The method also includes defining a completed portion of the shared secret based on the first portion of the shared secret and a second portion of the shared secret and storing the completed portion of the shared secret in a memory for a pre-defined period of time. The method includes defining a ticket based on the completed portion of the shared secret, and sending the ticket to a device associated with the user such that data associated with the ticket is accessible based on the ticket within the pre-defined period of time, and not accessible without the ticket or after the pre-defined period of time.

In such embodiments, a security module can be a hardware and/or software module (stored in memory and/or executed in a processor) in a core system that can be configured to be coupled to a network. The core system can include a query module coupled to a database in the core system that is not accessible from the network or the security module, and that can store encrypted data. The security module can be configured to receive encrypted information associated with a user via the network and calculate a first portion of a shared secret based on the encrypted information associated with the first user. The security module can also be configured to define a completed portion of the shared secret based on the first portion of the shared secret and a second portion of the shared secret that is accessible by the security module and not by the user. The security module can be configured to define a ticket based on the completed portion of the shared secret, and receive the encrypted data from the query module. The security module can be configured to receive the ticket from the query module and use the ticket to obtain the decryption key from a completed key table. The security module is configured to send the decryption key to the query module such that the query module can use the decryption key to decrypt the encrypted data, and send the decrypted data to a user device associated with the user.

In some embodiments, the core system can be an enterprise server, such as, for example, a web server, an application server, a proxy server, a telnet server, a file transfer protocol (FTP) server, a mail server, a list server, a collaboration server and/or the like. In other embodiments, the core system can be an enterprise device, such as, for example, a desktop computer, a laptop computer, a tablet personal computer (PC), and/or the like. In yet other embodiments, portions of the core system can be physically distributed across, for example, many chassis and/or modules interconnected by wired or wireless connections. The network can be any type of network such as a local area network (LAN), a wide area network (WAN), a virtual network, a telecommunications network, implemented as a wired network and/or wireless network.

In some embodiments, the query module can be a hardware and/or software module (stored in memory and/or executed in a processor) in the core system that can be coupled to a network and a database that is not accessible from the network or the security module. The query module can be configured to receive a query and a ticket from a user device associated with a user, the ticket being associated with a completed portion of the shared secret. The shared secret has a first portion that is associated with the user and a second portion that is not accessible to the user. The query module is configured to send the query to the database, and in response is configured to receive encrypted data from the database. The query module can send the ticket to the security module such that the security module uses the ticket to obtain a decryption key from a completed key table. The query module can receive, from the security module, the decryption key and can decrypt the encrypted data based on the decryption key to produce decrypted data, and can send the decrypted data to a user device associated with the user.

Figure 1:
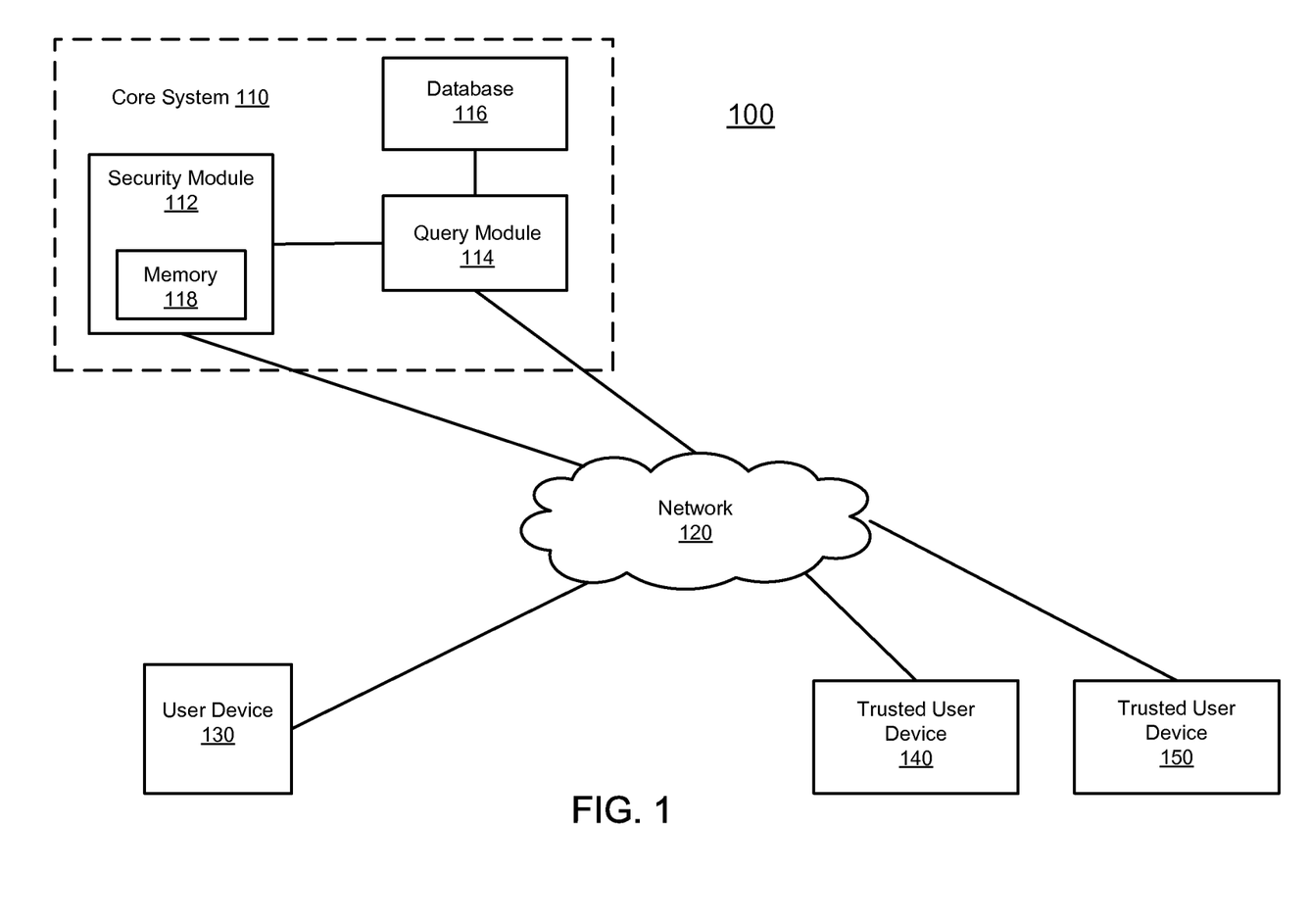
FIG. 1 is a schematic illustration of a system for protecting sensitive data, according to an embodiment.

FIG. 1 is a schematic illustration of a system for protecting sensitive data 100, according to an embodiment. The sensitive data can be, for example, data regulated by The Health Insurance Portability and Accountability Act of 1996 (HIPAA). The data protection system 100 includes a core system 110, a network 120, a user device 130, a trusted user device 140, and a trusted user device 150. The network 120 can be any type of network (e.g., a local area network (LAN), a wide area network (WAN), a virtual network, a telecommunications network) implemented as a wired network and/or wireless network. As described in further detail herein, in some embodiments, for example, the user device 130 and/or the trusted user devices 140 and 150 can be connected to the core system 110 via an intranet, an Internet Service Provider (ISP), the Internet, a cellular network (e.g., network 120), and/or the like.

In some embodiments, the core system 110 can be an enterprise server, such as, for example, a web server, an application server, a proxy server, a telnet server, a file transfer protocol (FTP) server, a mail server, a list server, a collaboration server, and/or the like. In other embodiments, the core system can be an enterprise device, such as, for example, a desktop computer, a laptop computer, a tablet personal computer (PC), and/or the like. In yet other embodiments, portions of the core system 110 can be physically distributed across, for example, many servers, devices, chassis and/or modules interconnected by wired connections such as, for example, optical connections (e.g., optical cables and optical connectors), electrical connections (e.g., electrical cables and electrical connectors) and/or the like, or wireless connections. The core system can include a security module 112, a query module 114, a database 116 and a memory 118.

The security module 112 can be a hardware and/or software module (stored in the memory and/or executed in a processor of a device) in the core system 110 that can be configured to be coupled to a network 120 and a query module 114 in the core system 110. In some embodiments, the security module 112 can be configured, for example, to build and manage cryptographic keys, provision encryption, decryption, authentication, and digital signing services, accelerate cryptoprocesses in terms of digital signings, provide authentication to access critical keys for enterprise applications, use cryptographic and sensitive data material, and/or the like. In some embodiments, the security module 112 can be or include a physical device such as, for example, a plug-in card or an external TCP/IP security device that can be attached directly to a server or general purpose computer. In other embodiments, the security module 112 can be a software module such as CryptoAPI, Cryptography API: Next Generation (CNG), and/or the like that is stored in the memory and/or executed in a processor of a device in the core system 110.

The query module 114 can be a hardware and/or software module (stored in memory and/or executed in a processor) in the core system 110 that can be coupled to a network 120 and a database 116 that is not accessible from the network or the security module 112. The query module 114 can be configured to, for example, receive a query and a ticket from a user on a user device 130. The query module 114 can be configured use the query and the ticket to obtain encrypted data from the database 116. The query module 114 can be configured to decrypt the encrypted data based on the decryption key provided by the security module 112 to produce decrypted data, and send the decrypted data to a user device 130 associated with the user.

In some embodiments, the database 116 can be a server located in the core system 110 such as, for example, an Oracle server, a DB2 server, an Informix server, an Ingres server, a SQL server, a MySQL server, and/or the like. In other embodiments, the database 116 can be a distributed database located at different devices that are operatively coupled together within the core system 110. In yet other embodiments, the database 116 can be a cloud database (also known as Database-as-a-Service (DBaaS)) such as, for example, a MySQL Cloud database that is operatively coupled to the core system 110 and can provide database services to the core system 110. The database 116 can be configured to store sensitive data associated with a user and can be coupled to the query module 114. The database 116 can be configured to be accessible only from the query module 114 and cannot be accessed from either the network 120 or the security module 112.

The memory 118 can be, for example, a random access memory (RAM), a memory buffer, a hard drive, a database, an erasable programmable read-only memory (EPROM), an electrically erasable read-only memory (EEPROM), a read-only memory (ROM) and/or so forth. In some embodiments, the memory 118 stores instructions to cause the processor in a device of the core system to execute modules, processes and/or functions associated with such a data protection system 100. In some embodiments, the memory 118 can be included in the security module 112, while in other embodiments, the memory 118 can be located anywhere in the core system 110 and can be operatively coupled to the security module 118.

The user device 130 can be a personal computing device such as a desktop computer, a laptop computer, a personal digital assistant (PDA), a standard mobile telephone, a tablet personal computer (PC), and/or so forth. The user device 130 is configured to send encrypted information associated with the user to the security module 112 via the network 120. Examples of such encrypted information can include, for example, a hashed form of the user password, a hashed form of the user password concatenated with the username, a user ID, and/or the like. The user device 130 is also configured to receive a ticket from the security module 112 that the user device 130 can use to send a query to the query module 114, and is response receive decrypted data associated with the query from the query module 114.

The trusted user devices 140 and 150 can be a personal computing device such as a desktop computer, a laptop computer, a personal digital assistant (PDA), a standard mobile telephone, a tablet personal computer (PC), and/or so forth. The trusted user devices 140 and 150 can be accessed by trusted individuals of an enterprise such as a health-care service provider. Trusted individuals of an enterprise can include, for example, C-level enterprise executives such as a Chief Executive Officer (CEO), a Chief Technology Officer (CTO), a Chief Operating Officer (COO), a Chief Information Offer (CIO), and/or the like. The trusted user devices 140 and 150 can be used by the trusted users to initiate decryption of all or portions of the user data in the enterprise for bulk analytics or administrative purposes that will not require the explicit cooperation or concurrent involvement of those users. The bulk analytics process can include data associated with multiple users that may or may not include data associated with the trusted users. The initiation of the bulk user data decryption can only take place when both the trusted individuals associated with trusted user device 140 and 150 act together using their respective usernames and passwords. This can protect the data protection system 100 from single user compromise.

Figure 2:
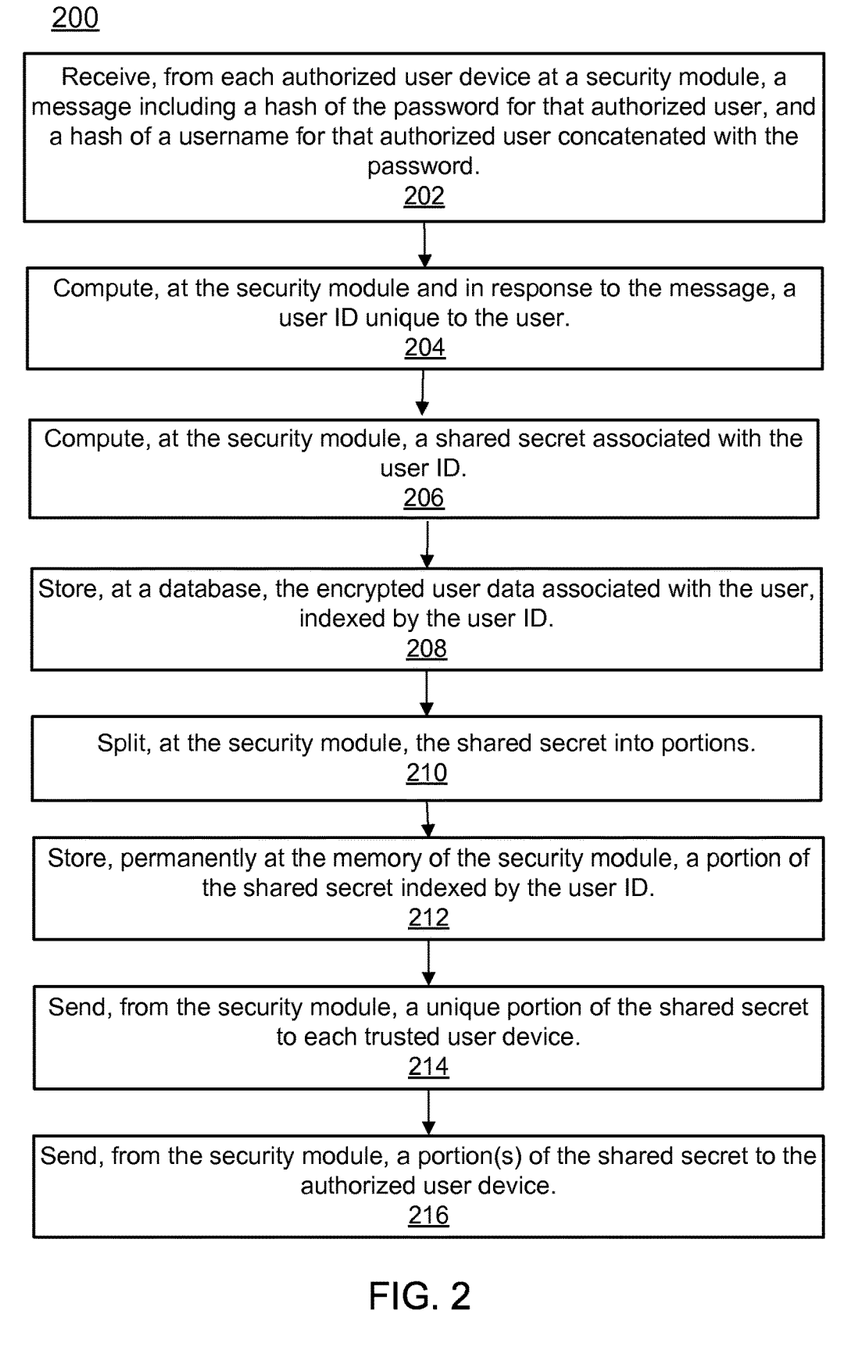
FIG. 2 is a flow chart illustrating a method of storing encrypted data associated with an authorized user, according to an embodiment.

FIG. 2 is a flow chart illustrating a method 200 for storing encrypted data associated with an authorized user of the data protection system, according to an embodiment. The method 200 includes receiving from each authorized user device at a security module, a message including a hash of a password for that authorized user, and a hash of a username for that authorized user concatenated with the password, at 202. As discussed above, in some embodiments, the user device can be a personal computing device such as a desktop computer, a laptop computer, a personal digital assistant (PDA), a standard mobile telephone, a tablet personal computer (PC), and/or so forth. As discussed above, the security module can be a hardware and/or software module (stored in the memory and/or executed in a processor of a device) in the core system. The encrypted data storing method 200 shown in FIG. 2 presents an example of one embodiment for such a method. In other embodiments, for example, the message received at a security module from each authorized user device, can include additional encrypted and/or un-encrypted user information such as, for example, user social security number, user health insurance policy ID number, user health insurance group number, user age, a user device identifier, and/or the like.

The security module can compute a user ID unique to each authorized user in response to the message, at 204. In some embodiments, the user ID can include an encrypted form of a user identity number that has been assigned to the authorized user. In other embodiments, the user ID can include, for example, additional encrypted or un-encrypted user information such as a user social security number, health insurance group number, health insurance ID number, age, sex, a user device identifier, and/or the like.

The security module can compute a shared secret associated with the user ID for each authorized user, at 206. The shared secret is computed to ensure that a predetermined set of users, and no one else, is able to reconstruct highly confidential information such as HIPAA data and other medical data associated with authorized users. The shared secret can be, for example, a password, a passphrase, a large number, an array of randomly chosen bytes, and/or the like. The shared secret can be used for authentication (for instance, when a user logs in to the data protection system) using methods such as challenge-response, or the shared secret can be fed to a key derivation function to produce one or more keys to use for encryption of messages or authentication of messages using message authentication code (MAC).

The encrypted user data associated with each authorized user as indexed by the user ID can be stored at a database in the core system, at 208. As discussed above, in some embodiments, the database can be a server located in the core system, and in other embodiments, the database can be a distributed database located at different devices that are operatively coupled together within the core system. In yet other embodiments, the database can be a cloud database (also known as Database-as-a-Service (DBaaS)) that is operatively coupled to the core system. In some embodiments, the encryption of the user data can take place in the core system using the completed shared secret or portions of it, while in other embodiments user data previously encrypted elsewhere can be stored in the database.

The completed shared secret is split into portions at the security module, at 210. The completed shared secret can be split using a number of different methods, such as, for example, Shamir's Secret Sharing Scheme, Blakey's Secret Sharing Scheme, Secret Sharing using the Chinese Remainder Theorem, Proactive Secret Sharing, and/or the like.

A portion of the shared secret is stored permanently at a memory associated with the security module and indexed by the user ID, at 212. As discussed above, in some embodiments, the memory can be located in the security module, while in other embodiments, the memory can be located elsewhere in the core system and can be operatively coupled to the security module.

The security module can send a unique portion of the shared secret to each trusted user device associated with a trusted individual, at 214. As discussed above, the trusted individuals can be, for example, C-level enterprise executives such as a Chief Executive Officer (CEO), a Chief Technology Officer (CTO), a Chief Operating Officer (COO), a Chief Information Offer (CIO), and/or the like. The trusted user devices can be used by the trusted users, for example, to initiate decryption of the all or portions of the user data in the enterprise for bulk analytics or administrative purposes that will not require the explicit cooperation of those users.

The security module can send a portion of the shared secret to the authorized user device, at 216. As discussed above, the user device can be a personal computing device such as a desktop computer, a laptop computer, a personal digital assistant (PDA), a standard mobile telephone, a tablet personal computer (PC), and/or so forth. This user device can be used by or accessible by a user that is associated with the user data (e.g., the data defined by the user and protected by HIPAA).

Figure 3:
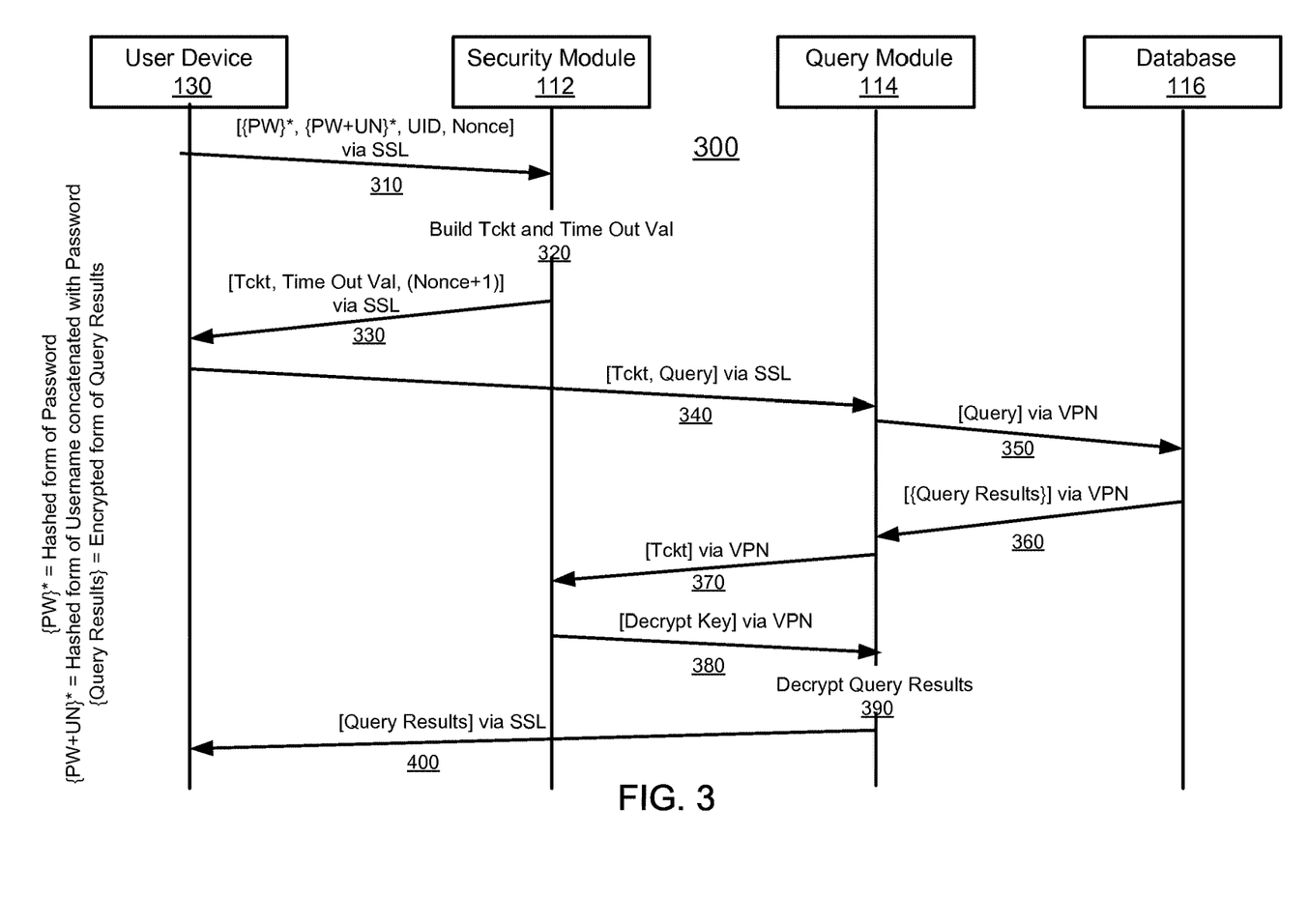
FIG. 3 is a message flow diagram illustrating a process for user authorized decryption of stored encrypted data, according to an embodiment.

FIG. 3 is a message flow diagram illustrating a process 300 for user authorized decryption of stored encrypted data, according to an embodiment. The process of obtaining decrypted data by a user device 130 involves establishing an encrypted channel from the user device 130 to the security module 112 to provide communication security over the network 120. Various cryptographic protocols such as, for example, Secure Sockets Layer (SSL) (versions 1.0, 2.0, 3.0), Transport Layer Security (TLS) (versions 1.0, 1.1, 1.2), and/or the like can be used to provide security to segments of the network 120 involved in this user-authorized encrypted data decryption process 300. At 310, the user device 130 sends to the security module 112 via a secure encrypted channel, a signal that includes a hashed form of the user password (PW), a hashed form of the username concatenated with the user password (PW+UN), a user ID (UID), and a nonce. The nonce can be an arbitrary random or pseudo-random number issued in the authentication step 310 to ensure that this communication is not reused in any replay attacks. To ensure that a nonce is used only once, the nonce can be time-variant by including a suitably fine-grained timestamp in its value or can be generated with enough random bits to ensure a probabilistically insignificant chance of repeating a previously generated value.

Upon receiving the encrypted signal from the user device 130, the security module 112 can calculate a first portion of a shared secret based on the encrypted information associated with the user device 130, and the completed portion of the shared secret based on the first portion of the shared secret and a second portion of the shard secret that is accessible by the security module 112 and not accessible by the user device 130. The security module 112 can be configured to store the completed portion of the shared secret in a memory 118 for a pre-defined period of time. At 320, the security module 112 can be configured to define a ticket based on the completed portion of the shared secret, and a time out value that determines how long the ticket will be valid. After the time-out value expires, the completed portion of the shared secret stored in the memory 118 is deleted and no longer accessible by the security module 112. The ticket can be a validated request that can allow devices or nodes communicating over a network 120 to establish their identity to one another in a secure manner, and can be, for example, a string of encrypted numbers, data stored in a dedicated file, and/or the like. At 330, the security module 112 can be configured to increment the nonce and send the ticket, the time-out value, and the incremented nonce to the user device 130, via the network 120 using any one of the security protocols as previously described, for example, SSL, TLS, etc.

At 340, the user device 130 can send the ticket and a query to the query module 114 via the network 120, using any one of the security protocols as previously described, for example, SSL, TLS, etc. The query can be, for example, a request for user medical records (such as pre-existing conditions, data associated with recent user hospitalizations, allergic reactions to drugs, etc.), user health insurance policy details, user health insurance group number, user social security number, user age, user sex, and/or the like. In some embodiments, the query can be a data packet that includes data associated with the information requested about the user, the user ID, the username, the user device number 130, and/or the like. In other embodiments, the query can include, for example, additional encrypted or unencrypted information associated with the user, the user device, the network session, and/or the like.

Upon receiving the ticket and query from the user device 130, in some embodiments, the query module 114 can assess the validity of the ticket and/or query before sending the query to the database 116 through, for example, a dedicated Virtual Private Network (VPN) interface, at 350. In some embodiments, the query module 114 can perform this verification by querying a new database (not the same as database 116) or a look-up table stored in the memory of a device in the core system 110 for data that can be associated with the ticket and/or query. In other embodiments, the new database or look-up table can be stored in the memory of a device outside the core system 110 that is operatively coupled to the core system 110. For example, in some embodiments, the query module 114 can acknowledge if the ticket and/or query has been received from an authorized user device 130. In other embodiments, the query module 114 can acknowledge if the query is related to HIPAA or other sensitive data associated with an authorized user. In yet other embodiments, the query module 114 can acknowledge if the timing information associated with the ticket is valid, and/or the like. In other embodiments, the query module 114 can be configured to forgo the proposed validation step and can be configured to directly send the query to the database 116 through a dedicated Virtual Private Network (VPN) interface, at 350.

The database 116 can be configured to use the query to lookup entire or portions of the encrypted user data associated with the authorized user as indexed by the query and/or user ID. In some embodiments, the database 116 can contain encrypted data, where the encryption of the user data was performed in the core system 110 using the complete shared secret or portions of it. In other embodiments, the database 116 can contain encrypted data, where the encryption process was performed outside the core system 110 and only the encrypted user data has been stored in the database 116. The database 116 can send the encrypted user data (query result) to the query module 114 through, for example, a dedicated VPN interface, at 360.

The query module 114 can be configured to send the ticket received from the user device 130 to the security module 112 through, for example, a dedicated VPN interface, at 370. The security 112 module can be configured to receive the ticket from the query module 114, and use the ticket to obtain the decryption key from the memory 118. The decryption key can be, for example, the complete shared secret, the first portion of the shared secret associated with the user, the second portion of the shared secret accessible by only the security module 112 and not the user device 130, or any combination thereof.

The security module 112 can be configured to send the decryption key to the query module 114 through, for example, a dedicated VPN interface, at 380. The query module 114 can be configured to receive the decryption key and decrypt the encrypted data (query result) using the decryption key to generate the decrypted data (query result), at 390. At 400, the query module 114 can be configured to send the decrypted query result to the user device 130 via the network 120 using any one of the security protocols as previously described, for example, SSL, TLS, etc.

In some embodiments, one or more of the steps shown in FIG. 3 can be optional to implement the process for user-authorized decryption of stored encrypted data 300. For example, in some embodiments, the query module 114 can be configured to directly decrypt the encrypted query results using the complete or portions of ticket and/or query. In such embodiments, steps associated with events 370 and 380 in FIG. 3 can be omitted in implementing the process for user authorized decryption of stored encrypted data 300. Such embodiments can significantly increase the efficiency and throughout of the secure data decryption process 300 because: (i) it can avoid the need for the security module 112 to compute and/or store a separate decryption key in the memory; (ii) it can avoid computational resources and time delays associated with sending the ticket from the query module 114 via a dedicated VPN interface to the security module 112; (iii) it can avoid computational resources and time delays associated with sending the decryption key from the security module 112 via a dedicated VPN interface to the query module 114.

Referring to FIGS. 1-3, in some embodiments, a bulk data decryption service can be implemented for performing large-scale analytics and other operations involving the decryption of many user records without the explicit cooperation or concurrent involvement of the users. This can be done by the security module 112 sending a unique portion of the shared secret to each trusted user at the trusted user device 140 and trusted user device 150. In some embodiments, the trusted user devices 140 and 150 can send encrypted trusted user information such as, for example, a trusted username, a trusted user ID, a trusted user password, and/or the like to the security module 112 via the network 120 using any one of the security protocols as previously described, for example, SSL, TLS, etc. The security module 112 can use this encrypted trusted user information to build a new ticket that can allow the trusted user devices 140 and 150 to begin the bulk analytics process in a manner similar to that described above. In other embodiments, upon successful logging in of the trusted users to the trusted user devices 140 and 150, the trusted user device 140 and 150 can retrieve the unique portion of the shared secret associated with the trusted user that was stored in a memory or look-up table in the trusted user device 140 and 150. In such embodiments, the trusted user device 140 and 150 can be configured to send the unique portion of the shared secret directly to the security module 112 via the network 120 using any one of the security protocols as previously described, for example, SSL, TLS, etc. The security module 112 can use the unique portion of the shared secret associated with the trusted user and the portion of the shared secret stored in the memory 118 that is accessible to the security module 112 (and not the user device 130) to build a new ticket that can allow the trusted user devices 140 and 150 to begin the bulk analytics process in a manner similar to that described above. Note that in both proposed embodiments, the initiation of the bulk user data decryption can only take place when both the trusted individuals associated with trusted user device 140 and 150 acts together. This can act to protect the data protection system 100 from single user compromise.

Figure 4:
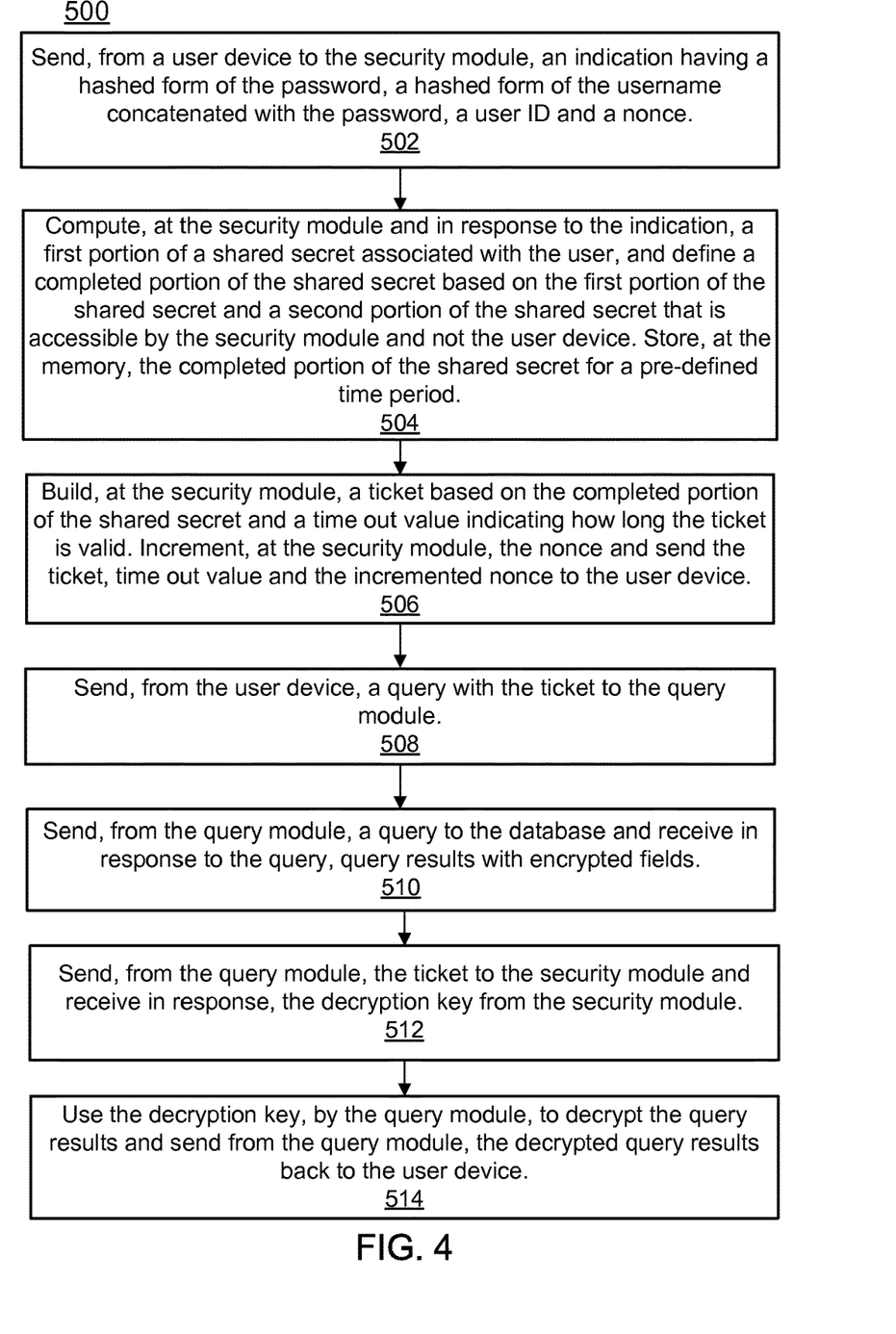
FIG. 4 is a flow chart illustrating a process for user authorized decryption of stored encrypted data, according to another embodiment.

FIG. 4 is a flow chart illustrating a process 500 for user-authorized decryption of stored encrypted data, according to another embodiment. The method 500 includes sending from a user device to the security module, an indication having a hashed form of the password, a hashed form of the username concatenated with the password, a user ID and a nonce, at 502. In some embodiments, the indication sent from the user device to the security module can include additional encrypted and/or un-encrypted user information such as, for example, user social security number, user health insurance policy ID number, user health insurance group number, user age, a user device identifier, and/or the like. As discussed above, in some embodiments, the user device can be a personal computing device such as a desktop computer, a laptop computer, a personal digital assistant (PDA), a standard mobile telephone, a tablet personal computer (PC), and/or so forth. As discussed above, the security module can be a hardware and/or software module (stored in the memory and/or executed in a processor of a device) in the core system. As discussed above, in some embodiments, the nonce can be an arbitrary random or pseudo-random number with a suitably fine-grained timestamp in its value or generated with enough random bits to ensure a probabilistically insignificant chance of repeating a previously generated value. This is to ensure that a nonce can be used only once and the communication can not be reused in any replay attacks.

The security module can, in response to the indication, compute a first portion of the shared secret associated with the user, and define a completed portion of the shared secret based on the first portion of the shared secret and a second portion of the shared secret that is accessible by the security module and not accessible by the user device, at 504. In some embodiments, when there are multiple users (or user devices), the portion of the shared secret associated with one user is not derivable from the encrypted information associated with another user. The security module can also store for a pre-determined time period, the completed portion of the shared secret at a memory. As discussed above, in some embodiments, the memory can be located inside the security module, while in other embodiments, the memory can be located anywhere in the core system and can be operatively coupled to the security module.

The security module can define a ticket based on the completed portion of the shared secret, and a time-out value indicating how long the ticket is valid, at 506. The security module can increment the nonce and send the ticket, the time out value and the new incremented nonce to the user device, at 506. As discussed above, a ticket can be validated request that can allow devices or nodes communicating over a network to establish their identity to one another in a secure manner, and can be, for example, a string of encrypted numbers, data stored in a dedicated file, and/or the like.

The user device can send the ticket received from the security module along with a query to the query module, at 508. As discussed above, in some embodiments, the query can be, for example, a request for user medical records, user health insurance policy details, user insurance group number, user social security number, user age, user sex, and/or the like. In other embodiments, the query can be a data packet that includes additional information such as, for example, the user ID, the username, the user device number, and/or the like. In yet other embodiments, the query can include, for example, additional encrypted or unencrypted information associated with the user, the user device, the network session, and/or the like.

The query module can send the query to the database, and receive in response to the query, query results containing encrypted fields, at 510. The query module can send the ticket received from the user device to the security module to obtain the decryption key stored at the memory associated with the security module, at 512. The security module can use the ticket received from the query module to obtain decryption key and can send the decryption key to the query module, at 512.

The query module can use the decryption key received from the security module to decrypt the query results with encrypted fields and generate the decrypted query results. The query module can send the decrypted query results back to the user device, at 514.

It should be noted that the embodiment of the data protection system described in FIGS. 1-4, has been presented by way of an example and is shown as involving one user device, two trusted user devices, and the shared secret being portioned into four portions. In other embodiments, for example for the case of an enterprise like a health-care service provider, the number of users and user devices can be in the millions, and the number of trusted users and trusted user devices can be in the hundreds. In such embodiments, the shared secret can be split into hundreds or thousands of portions. In some embodiments, the security module can split the shared secret into any number of portions, and send one or multiple unique portions of the shared secret to a user device associated with an authorized user. In some embodiments, the security module can split the shared secret into any number of portions, and send one or multiple unique portions of the shared secret to each trusted user device associated with a respective trusted user.

In some embodiments, one or multiple unique portions of the shared secret from each authorized user (or user device) can be used to build/generate the completed shared secret that allows successful authentication of an authorized user (or user device) to the data protection system. In some embodiments, one or multiple unique portions of the shared secret from each trusted user (or trusted user device) can be used to build/generate the completed shared secret that can allows successful authentication of a trusted user (or trusted user device) to the data protection system. In such embodiments, bulk analytics can only be initiated when all of a predetermined number of trusted user devices successfully authenticate and log in to the data protection system and request retrieval of user data.

The security features that can be provided by such a data protection system are several fold: (i) in case of a password compromise of one user, stored encrypted data associated with other users in the enterprise cannot be accessed through use of the compromised password and will remain secure; (ii) bulk analytics cannot be initiated if any number of trusted users less than the predetermined number of trusted users are compromised and/or maliciously attempt to log in to the data protection system to retrieve user data; and (iii) the portion of the shared secret associated with the user and the trusted users are not stored for long periods in the security module, which can minimize the risk of theft in case a user identity or a trusted user identity has been compromised at the security module.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

What is claimed is:

1. A method, comprising:
receiving, at a security module of an enterprise system, encrypted information associated with a first user;
calculating, at the security module, a first portion of a shared secret based on the encrypted information associated with the first user;
splitting, during a first time period, the first portion of the shared secret into a set of unique split portions;
sending, during the first time period and to each trusted user device of a set of trusted user devices, at least one unique split portion of the set of unique split portions, the set of trusted user devices being associated with a set of authorized users;
receiving, after the first time period and from the set of trusted user devices, the set of unique split portions of the first portion of the shared secret;
defining, at the security module, a completed portion of the shared secret based on the set of unique split portions received from the set of trusted user devices and a second portion of the shared secret that is accessible by the security module and not accessible by the first user;
storing, at the security module, the completed portion of the shared secret in a memory for a pre-defined period of time;
defining a ticket based on the completed portion of the shared secret;
sending, to a communication device of the first user external to the enterprise system, the ticket such that data is accessible based on the ticket within the pre-defined period of time and not accessible without the ticket or after the pre-defined period of time; and
in response to receiving the ticket at the security module from a query module of the enterprise system, sending from the security module a decryption key within the enterprise system to the query module such that the data in a first form is decrypted by the query module based on the decryption key to produce the data in a second form and sent from the query module to the first user in the second form that is viewable by the first user without the decryption key, the decryption key being the completed portion of the shared secret.

2. The method of claim 1, wherein the data is associated with the first user, the shared secret having a third portion (1) associated with a second user and (2) not accessible to the first user nor derivable from the encrypted information associated with the first user.

3. The method of claim 1, wherein the data is associated with a second user, the shared secret having a third portion associated with the second user and not derivable from the encrypted information associated with the first user.

4. The method of claim 1, wherein the data is associated with a second user, the method further comprising:
receiving encrypted information associated with a third user;
calculating a third portion of a shared secret based on the encrypted information associated with the third user; and
defining the completed portion of the shared secret based on the first portion of the shared secret, the second portion of the shared secret and third portion of the shared secret.

5. The method of claim 1, wherein the data is associated with a second user, the method further comprising:
receiving encrypted information associated with a third user;
calculating a third portion of a shared secret based on the encrypted information associated with the third user; and
defining the completed portion of the shared secret based on the first portion of the shared secret, the second portion of the shared secret and third portion of the shared secret, the first portion of the shared secret not being accessible by the second user or the third user, the second portion of the shared secret not being accessible by the first user, the second user or the third user, the third portion of the shared secret not being accessible by the first user or the second user.

6. The method of claim 1, wherein the data is associated with a second user, the method further comprising:
receiving encrypted information associated with a third user;
calculating a third portion of a shared secret based on the encrypted information associated with the third user; and
defining the completed portion of the shared secret based on the first portion of the shared secret, the second portion of the shared secret and third portion of the shared secret, the first portion of the shared secret not being accessible by the second user or the third user, the second portion of the shared secret not being accessible by the first user, the second user or the third user, the third portion of the shared secret not being accessible by the first user or the second user;

the second user is a customer of a health-care service provider, the first user and the third user each being a trusted employee of the health-care service provider.

7. The method of claim 1, wherein the sending the decryption key includes sending via a secured communication channel, the secured communication channel being a Virtual Private Network (VPN) interface of the enterprise system.

8. The method of claim 1, wherein the data in the first form is not accessible by the communication device of the first user.

9. The method of claim 1, wherein the data in the first form is not accessible by the communication device of the first user, the data in the second form being accessible by the communication device of the first user only via the query module.

10. The method of claim 1, wherein prior to the sending the decryption key the data in the first form is stored at a database within the enterprise system, the database being accessible by the communication device of the first user only via the query module.

11. The method of claim 1, wherein the splitting of the first portion of the shared secret is carried out using Shamir's Secret Sharing Scheme, Blakey's Secret Sharing Scheme, Secret Sharing using the Chinese Remainder Theorem, or Proactive Secret Sharing.

12. An apparatus, comprising:
a security module implemented in at least one of a memory or a processing device of a compute device, the security module configured to be coupled to a network and a query module that is coupled to a database that is (1) not accessible from the security module, and (2) storing encrypted data, the encrypted data being associated with an encryption key, the encryption key being associated with a decryption key, the security module configured to:
receive encrypted information associated with a first user via the network;
calculate a first portion of a shared secret based on the encrypted information associated with the first user;
split during a first time period the first portion of the shared secret into a set of unique split portions;
send during the first time period, to each trusted user device of a set of trusted user devices, at least one unique split portion of the set of unique split portions of the first portion of the shared secret;
receive after the first time period, from the set of trusted user devices, the set of unique split portions of the first portion of the shared secret;
define a completed portion of the shared secret based on the set of unique split portions received from the set of trusted user devices and a second portion of the shared secret that is accessible by the security module and not accessible by the first user;
the decryption key being the completed portion of the shared secret;
define a ticket based on the completed portion of the shared secret;
send, to a user device associated with the first user external to the enterprise system, the ticket such that the encrypted data is accessible based on the ticket;
receive from the query module the ticket;

obtain the decryption key based on the ticket;
send the decryption key to the query module such that the encrypted data is decrypted at the query module to produce decrypted data and sent to the user device associated with the first user;
the user device not receiving the encryption key or the decryption key;
the database being accessible by the user device only via the query module.

13. The apparatus of claim 12, wherein the security module is configured to store the completed portion of the shared secret for a pre-defined period of time, the completed portion of the shared secret being deleted after the pre-defined period of time such that the completed portion of the shared secret is no longer accessible by the security module after the pre-defined period of time.

14. The apparatus of claim 12, wherein the encrypted data is associated with the first user, the shared secret having a third portion associated with a second user and not derivable from the encrypted information associated with the first user.

15. The apparatus of claim 12, wherein the encrypted data is associated with a second user, the shared secret having a third portion associated with the second user and not derivable from the encrypted information associated with the first user.

16. The apparatus of claim 12, wherein:
the encrypted data is associated with a second user,
the security module configured to receive encrypted information associated with a third user via the network, the security module configured to calculate a third portion of a shared secret based on the encrypted information associated with the third user, the security module configured to define the completed portion of the shared secret based on the first portion of the shared secret, the second portion of the shared secret and third portion of the shared secret.

17. The apparatus of claim 12, wherein:
the encrypted data is associated with a second user,
the security module configured to receive encrypted information associated with a third user via the network, the security module configured to calculate a third portion of a shared secret based on the encrypted information associated with the third user, the security module configured to define the completed portion of the shared secret based on the first portion of the shared secret, the second portion of the shared secret and third portion of the shared secret,
the first portion of the shared secret is not accessible by the second user or the third user, the second portion of the shared secret is accessible by the security module and not accessible by the first user, the second user or the third user, the third portion of the shared secret is not accessible by the first user or the second user.

18. The apparatus of claim 12, wherein:
the encrypted data is associated with a second user,
the security module configured to receive encrypted information associated with a third user via the network, the security module configured to calculate a third portion of a shared secret based on the encrypted information associated with the third user, the security module configured to define the completed portion of the shared secret based on the first portion of the shared secret, the second portion of the shared secret and third portion of the shared secret,
the second user is a customer of a health-care service provider, the first user and the third user each being a trusted employed of the health-care service provider.

19. The apparatus of claim 12, wherein the decrypted data is accessible by the user device only via the query module.

20. The apparatus of claim 12, wherein the encrypted data is inaccessible by the user device.

21. The apparatus of claim 12, wherein the security module, the database, and the query module are all included within an enterprise system.

22. The apparatus of claim 12, wherein the security module is configured to be coupled to the query module via a secured communication channel.

23. The apparatus of claim 12, wherein the security module is configured to be coupled to the query module via a Virtual Private Network (VPN) interface.

24. An apparatus, comprising:
a query module implemented in at least one of a memory or a processing device of a compute device, the query module configured to be operatively coupled to (1) a network, (2) a security module, and (3) a database not accessible from the network or the security module, the query module configured to:
receive a query and a ticket from a user device associated with a user, the ticket being issued to the user device by the security module and associated with a completed portion of a shared secret stored in the security module, the shared secret having a first portion associated with the user device and a second portion not accessible to the user device, the first portion being based on at least two unique split portions received by the security module from a set of two or more trusted user devices;
send the query to the database;
receive encrypted data from the database in response to the query, the encrypted data from the database being associated with an encryption key, the encryption key being associated with a decryption key, the decryption key being the completed portion of the shared secret, the encrypted data being inaccessible by the user device;
send the ticket to the security module;
receive the decryption key based on the ticket;
decrypt the encrypted data based on the decryption key to produce decrypted data; and
send the decrypted data to the user device, the user device not receiving the encryption key or the decryption key.

25. The apparatus of claim 24, wherein the completed portion of the shared secret is associated with a pre-defined period of time, the query module configured to send the ticket to the security module within the pre-defined period of time, the completed portion of the shared secret being deleted after the pre-defined period of time such that the completed portion of the shared secret is no longer accessible by the security module after the pre-defined period of time.

26. The apparatus of claim 24, wherein the encrypted data and the decrypted data are health-care information of the user.

27. The apparatus of claim 24, wherein the user is a trusted user, the encrypted data being associated with a plurality of users not including the trusted user.

28. The apparatus of claim 24, wherein the user is a trusted user of the health-care service provider, the encrypted data being associated with a plurality of customers of the health-care service provider.

29. The apparatus of claim 24, wherein the query module is configured to send the decrypted data to the user device such that the decrypted data is viewable without the decryption key at the user device.

30. The apparatus of claim 24, wherein the query module is configured to be operatively coupled to the security module via a secured communication channel.

31. The apparatus of claim 24, wherein the query module is configured to be operatively coupled to the security module via a Virtual Private Network (VPN) interface.

32. The apparatus of claim 24, wherein the query module is configured to be coupled to the database via a secured communication channel.

33. The apparatus of claim 24, wherein the database is accessible by the user device only via the query module.

34. The apparatus of claim 24, wherein the decrypted data is accessible by the user device only via the query module.

35. The apparatus of claim 24, wherein the security module, the database, and the query module are all included within an enterprise system.

* * * * *